(12) United States Patent
Satzoda et al.

(10) Patent No.: US 10,037,471 B2
(45) Date of Patent: Jul. 31, 2018

(54) SYSTEM AND METHOD FOR IMAGE ANALYSIS

(71) Applicant: Nauto, Inc., Palo Alto, CA (US)

(72) Inventors: Ravi Kumar Satzoda, Palo Alto, CA (US); Suchitra Sathyanarayana, Palo Alto, CA (US)

(73) Assignee: Nauto Global Limited, Dublin (IE)

( * ) Notice: Subject to any disclaimer, the term of this patent is extended or adjusted under 35 U.S.C. 154(b) by 0 days.

(21) Appl. No.: 15/641,982

(22) Filed: Jul. 5, 2017

(65) Prior Publication Data

US 2018/0012082 A1   Jan. 11, 2018

Related U.S. Application Data

(60) Provisional application No. 62/358,392, filed on Jul. 5, 2016.

(51) Int. Cl.
*G06K 9/62* (2006.01)
*G06K 9/00* (2006.01)

(52) U.S. Cl.
CPC ....... *G06K 9/00791* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 5,584,035 A | * | 12/1996 | Duggan .............. G06F 3/04817 345/619 |
| 5,638,116 A | | 6/1997 | Shimoura et al. |
| 5,898,390 A | | 4/1999 | Oshizawa et al. |
| 6,018,728 A | * | 1/2000 | Spence ................ G06K 9/3233 706/20 |
| 6,240,367 B1 | | 5/2001 | Lin |
| 6,480,784 B2 | | 11/2002 | Mizuno |
| 6,502,033 B1 | | 12/2002 | Phuyal |
| 6,720,920 B2 | | 4/2004 | Breed et al. |
| 7,085,637 B2 | | 8/2006 | Breed et al. |
| 7,212,651 B2 | | 5/2007 | Viola et al. |
| 7,421,321 B2 | | 9/2008 | Breed et al. |
| 7,471,929 B2 | | 12/2008 | Fujioka et al. |
| 7,502,677 B2 | | 3/2009 | Weichenberger et al. |

(Continued)

*Primary Examiner* — Jay Patel
*Assistant Examiner* — Shadan E Haghani
(74) *Attorney, Agent, or Firm* — Jeffrey Schox; Diana Lin

(57) ABSTRACT

A method for image analysis, including recording an image sequence at a vehicle system mounted to a vehicle; automatically detecting an object within the image sequence with a detection module; automatically defining a bounding box about the detected object within each image of the image sequence; modifying the image sequence with the bounding boxes for the detected object to generate a modified image sequence; at a verification module associated with the detection module, labeling the modified image sequence as comprising one of a false positive, a false negative, a true positive, and a true negative detected object based on the bounding box within at least one image of the modified image sequence; training the detection module with the label for the modified image sequence; and automatically detecting objects within a second image sequence recorded with the vehicle system with the trained detection module.

17 Claims, 9 Drawing Sheets

(56) References Cited

U.S. PATENT DOCUMENTS

| | | |
|---|---|---|
| 7,502,688 B2 | 3/2009 | Hirokawa |
| 7,558,672 B2 | 7/2009 | Egami et al. |
| 7,844,077 B2 | 11/2010 | Kochi et al. |
| 7,853,072 B2 | 12/2010 | Han et al. |
| 7,868,821 B2 | 1/2011 | Hoshizaki |
| 7,912,288 B2 | 3/2011 | Winn et al. |
| 8,174,568 B2 | 5/2012 | Samarasekera et al. |
| 8,195,394 B1 | 6/2012 | Zhu et al. |
| 8,254,670 B2 | 8/2012 | Prokhorov |
| 8,266,132 B2 | 9/2012 | Ofek et al. |
| 8,301,344 B2 * | 10/2012 | Simon ................. B60R 1/00 701/45 |
| 8,344,849 B2 | 1/2013 | Larsson et al. |
| 8,447,519 B2 | 5/2013 | Basnayake et al. |
| 8,498,813 B2 | 7/2013 | Oohashi et al. |
| 8,594,920 B2 | 11/2013 | Shida |
| 8,606,492 B1 | 12/2013 | Botnen |
| 8,676,498 B2 | 3/2014 | Ma et al. |
| 8,744,642 B2 | 6/2014 | Nemat-Nasser et al. |
| 8,854,199 B2 | 10/2014 | Cook et al. |
| 8,952,819 B2 | 2/2015 | Nemat-Nasser |
| 9,053,554 B2 | 6/2015 | Uchida et al. |
| 9,121,713 B2 | 9/2015 | Samarasekera et al. |
| 9,146,558 B2 | 9/2015 | Field et al. |
| 9,158,962 B1 | 10/2015 | Nemat-Nasser et al. |
| 9,180,887 B2 | 11/2015 | Nemat-Nasser et al. |
| 9,201,932 B2 | 12/2015 | Silver et al. |
| 9,235,750 B1 | 1/2016 | Sutton et al. |
| 9,305,214 B1 * | 4/2016 | Young ............... G06K 9/00523 |
| 9,327,743 B2 | 5/2016 | Green et al. |
| 9,349,113 B2 | 5/2016 | Bashkin |
| 9,358,976 B2 | 6/2016 | Stierlin |
| 9,491,374 B1 | 11/2016 | Avrahami et al. |
| 9,535,878 B1 | 1/2017 | Brinkmann et al. |
| 9,573,541 B2 | 2/2017 | Graumann et al. |
| 9,679,480 B2 | 6/2017 | Hakeem |
| 9,718,468 B2 | 8/2017 | Barfield, Jr. et al. |
| 9,734,414 B2 | 8/2017 | Samarasekera et al. |
| 9,734,455 B2 | 8/2017 | Levinson et al. |
| 9,881,218 B2 | 1/2018 | Ogata et al. |
| 9,892,558 B2 | 2/2018 | Troy et al. |
| 9,928,432 B1 | 3/2018 | Sathyanarayana et al. |
| 2003/0095140 A1 * | 5/2003 | Keaton ................. G06F 3/011 715/700 |
| 2004/0051659 A1 | 3/2004 | Garrison |
| 2006/0106534 A1 | 5/2006 | Kawamata et al. |
| 2007/0050108 A1 | 3/2007 | Larschan et al. |
| 2007/0154100 A1 * | 7/2007 | Au ..................... G06K 9/00791 382/226 |
| 2008/0243378 A1 | 10/2008 | Zavoli |
| 2009/0244291 A1 * | 10/2009 | Saptharishi ........ G06K 9/00771 348/187 |
| 2013/0093886 A1 | 4/2013 | Rothschild |
| 2013/0147661 A1 | 6/2013 | Kangas et al. |
| 2013/0155229 A1 * | 6/2013 | Thornton ................. H04N 7/18 348/143 |
| 2013/0211687 A1 * | 8/2013 | Trost ........................ B60T 7/22 701/70 |
| 2014/0049601 A1 * | 2/2014 | Pfeil .................. H04N 5/23238 348/36 |
| 2014/0213300 A1 * | 7/2014 | Spears .................. H04W 4/022 455/456.3 |
| 2015/0049195 A1 | 2/2015 | Ishigaki et al. |
| 2015/0294422 A1 | 10/2015 | Carver et al. |
| 2016/0063761 A1 | 3/2016 | Sisbot et al. |
| 2016/0086021 A1 | 3/2016 | Grohman et al. |
| 2016/0169690 A1 | 6/2016 | Bogovich et al. |
| 2016/0244022 A1 | 8/2016 | Lippman et al. |
| 2016/0300242 A1 | 10/2016 | Truong et al. |
| 2017/0039850 A1 | 2/2017 | Vanden Berg et al. |
| 2017/0048239 A1 | 2/2017 | Jeon et al. |
| 2017/0053167 A1 * | 2/2017 | Ren .................... G06K 9/00624 |
| 2017/0053555 A1 | 2/2017 | Angel et al. |
| 2017/0061222 A1 | 3/2017 | Hoye et al. |
| 2017/0064363 A1 | 3/2017 | Wexler et al. |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0113664 A1 | 4/2017 | Nix |
| 2017/0146801 A1 | 5/2017 | Stempora |
| 2017/0293819 A1 | 10/2017 | Deng |
| 2017/0309072 A1 | 10/2017 | Li et al. |
| 2018/0107882 A1 | 4/2018 | Ogata et al. |

\* cited by examiner

SYSTEM AND METHOD FOR IMAGE ANALYSIS

CROSS-REFERENCE TO RELATED APPLICATIONS

This application claims the benefit of U.S. Provisional Application Ser. No. 62/358,392, filed 5 Jul. 2016, which is incorporated herein in its entirety by this reference.

TECHNICAL FIELD

This invention relates generally to the automotive field, and more specifically to a new and useful system and method for image analysis in the automotive field.

BACKGROUND

Autonomous driving technologies often rely on object recognition and analysis in images, particularly using trained models. However, the gathering of suitable training data from real-world driving scenarios is difficult due to the low frequency of suitably relevant driving events and the difficulty in labeling the large volume of gathered data to be used for training. This inability to perform object recognition, detection, identification, and classification in the context of real-world driving events at a large scale, as the inventors have discovered, creates a significant barrier to developing accurate and efficient automated processes for controlling autonomous and semi-autonomous vehicles, as well as performing other distributed computing and analysis tasks and actions, via real-time image analysis and other suitable analyses.

Thus, there is a need in the automotive field to create a new and useful system and method for image analysis. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
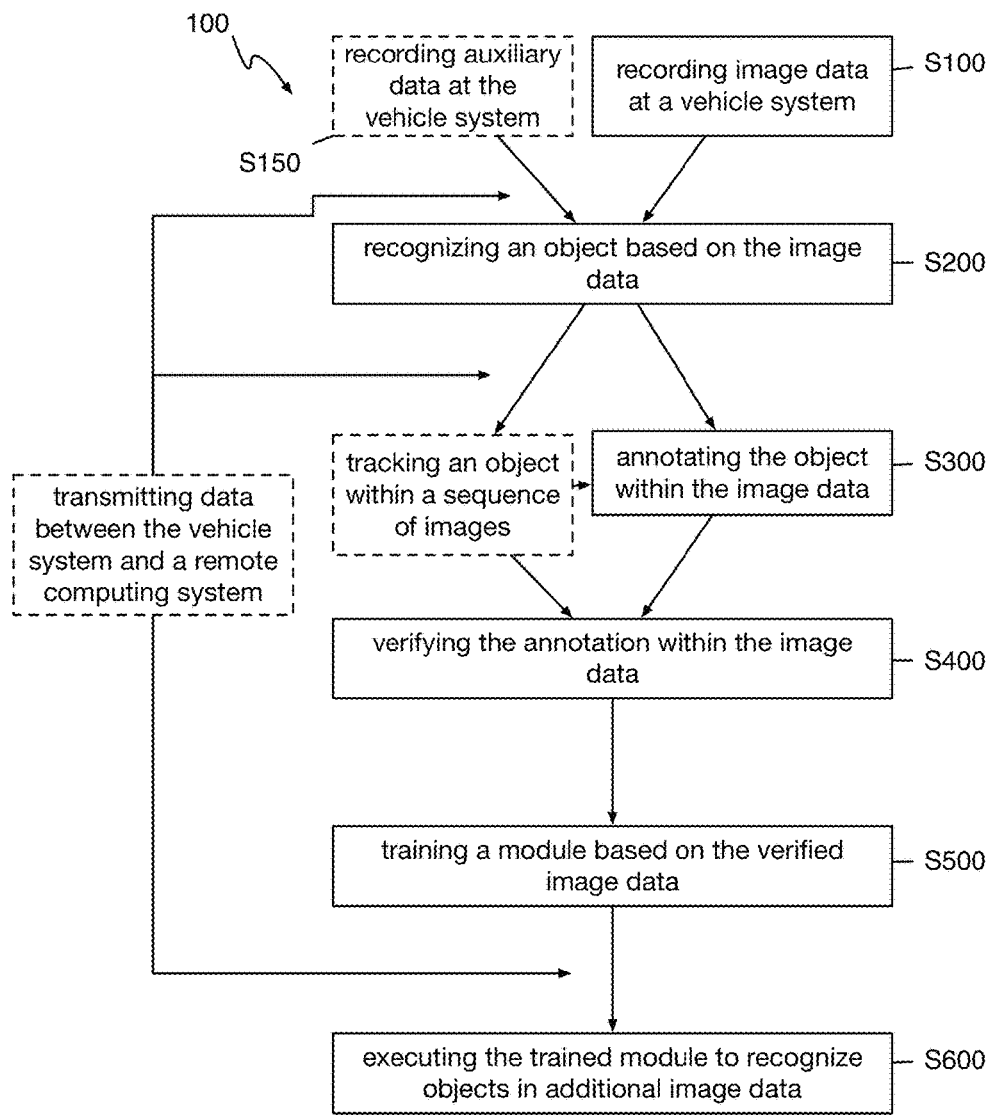
FIG. 1 depicts a flowchart of a variation of the method for image analysis.

As shown in FIG. 1, the method 100 for image analysis includes: recording image data at a vehicle system S100; recognizing an object based on the image data S200; annotating the object within the image data S300; verifying the annotation within the image data S400; training a module based on the verified image data S500; and executing the trained module to recognize objects in additional image data S600. The method can also include recording auxiliary data at the vehicle system S150, transmitting image data between the vehicle system and a remote computing system S700, and tracking an object trajectory within a sequence of images S800.

The method functions to detect and classify objects in images. The images are preferably gathered (e.g., recorded, obtained, etc.) at a vehicle system mounted to a vehicle during operation (e.g., driving). However, the images can alternatively be gathered and/or obtained in any other suitable manner via any other suitable system. The method can also function to train computational models (e.g., to train a network) that can be used to detect, identify, classify, and/or otherwise recognize objects in images and/or image sequences. The method can also function to automatically label real-world data (e.g., generate label data from real-world events recorded in images) based on the context in which the real-world data is collected (e.g., location, time of day, type of driving environment, etc.). The method can also function to automatically correct labels via one or more feedback loops, in which raw data is labeled via a model, the labels are evaluated for correctness, and the corrected labeled data is re-labeled via the model to train the model and validate the corrected labels. Such feedback loops can include automated feedback, semi-automated feedback, and/or manual feedback loops (e.g., wherein a human user acts as a corrector of data labels). However, the method can have any other suitable function related to object recognition, detection, and/or classification in images.

The method 100 is preferably implemented by, at, and/or in conjunction with a related system 200, which can include a vehicle system, a vehicle, one or more computing systems that define one or more processing modules, and one or more databases. The system 200 can include any suitable number of modules, architected in any suitable manner (e.g., having any suitable mutual interconnectivity). One or more modules can be implemented and/or executed at the vehicle system (e.g., at a processor of the vehicle system), a remote computing system (e.g., a remote server, a set of networked remote servers, etc.), a peer-to-peer network (e.g., a mesh network including a plurality of vehicle systems and/or other computing systems associated with a plurality of vehicles), and any other suitable computing system. Additional details pertaining to the system 200 are provided in the System section below. However, the method 100 can be otherwise suitably implemented at any other suitable system.

The method 100 preferably includes gathering data (e.g., image data), processing the data in one or more physical locations using one or more processing modules, training the modules (e.g., computational models implemented by the modules) based on the output of the data processing, and updating the modules based on the training results. Processing can occur at the vehicle system, a local (e.g., proximal to the vehicle system) computing system (e.g., a mobile device associated with the vehicle, associated with a driver of the vehicle, etc.), a remote computing system, and/or any combination thereof. Data gathering (e.g., recordation, detection, etc.) is preferably performed at the vehicle system, and then data is preferably transmitted to a remote computing system (e.g., after processing at the vehicle system, before processing, after a first portion of total processing wherein a second portion of total processing occurs at the remote computing system, etc.). However, information and/or data can be otherwise suitably transferred between elements or components of the system.

Portions of the method 100 can be performed based on image data. Image data can include single images (e.g., frames), image sequences (e.g., video, bursts of frames, etc.), and any other suitable image data. The image data that forms the basis for various portions and/or blocks of the method 100 can include all the image data gathered during a driving session (e.g., a time window spanning a continuous period of vehicle operation), or a subset of the image data gathered during a driving session (e.g., within a time window spanning an analysis event). An analysis event that can form the basis for a time window from which to select relevant image data can include a crash event, a start or end event of a driving session (e.g., turning on a vehicle, turning off a vehicle), a swerve, a hard-braking event, a horn honking event (e.g., activation of the vehicle horn, detection of an audible horn of another vehicle proximal the vehicle, etc.), and any other suitable event.

Portions of the method 100 can be performed based on vehicle operational data (e.g., determined based on image data, auxiliary data, and any other suitable data), and/or generate vehicle operational data. Vehicle operational data can include vehicle outputs (e.g., engine output power, transmission gear state, throttle and/or accelerator pedal position, fuel injection parameters, voltage and/or current values of any vehicle components operating on electrical power, brake lever position, brake pedal position, brake caliper position, etc.), vehicle kinematics (e.g., acceleration, velocity, position, planned traversal path, current traversal path, past traversal path, etc.), vehicle inputs (e.g., accelerator pedal position, steering wheel position, gear shifter position, door position, such as open or closed, etc.), driver parameters (e.g., whether the driver is distracted or not, a distraction level of a distracted driver, a head position of a driver, whether the driver is scored as a good driver or poor driver, etc.), vehicle cabin parameters (e.g., noise levels, number of passengers in the vehicle, etc.), and any other suitable data related to the operation of a vehicle.

Portions of the method 100 can be performed based on driver behavior data, and can include determining driver behavior data (e.g., data from which driver actions and/or behaviors can be determined). In a first example, driver behavior data includes imagery data (e.g., a sequence of images) recorded by the vehicle system of the driver of the vehicle during vehicle operation (e.g., a driving session). Driver behavior data can include data indicative of a driver distraction level, driving tendencies, and/or any other suitable data associated with behaviors of the driver.

2. BENEFITS

The system and method can confer several benefits over conventional systems. First, variants of the method can include recording event-based data at the point of event occurrence (e.g., point in time, point in space, at the vehicle during a driving session, etc.), which can eliminate the need for continuous image data gathering and/or analysis and thereby increase efficiency. In addition, the gathered data is of high quality (e.g., high information entropy) for module training purposes; for example, the method can include gathering imagery data when a driving event occurs (e.g., a swerve detected via an accelerometer of the vehicle system) which ensures that the imagery is relevant to the event without a need for ex post facto time synchronization.

Second, variants of the method can incorporate contextual information into image analyses that can, for example, reduce the computational load of various processing modules and/or improve the efficiency of object analysis. Contextual information can include the geographic location of the vehicle, vehicle speed, roadway type, time of day, scheduling information, temperature proximal to the vehicle, humidity level proximal to the vehicle, light level proximal to the vehicle, and any other suitable contextual information. The contextual information can be used as the basis for various blocks of the method; for example, the method can include determining that the vehicle is driving on a highway or freeway based on a combination of an inertial measurement unit (IMU) signal and a speed signal received from an OBD module coupled to the vehicle, and enabling a lane-line classification module based on that determination. In another example, the method can include determining that the vehicle is navigating a surface street based on a GPS signal, and enabling a pedestrian classification module based on that determination. Thus, as shown by way of the preceding examples, image analyses can be streamlined to account for the vehicle context. However, contextual information can otherwise form the basis for any blocks of the method 100 in any suitable manner.

Third, variants of the method can improve the function of various systems and/or hardware. For example, variants of the method can improve the performance of autonomous vehicles controlled via image-based computer vision and machine learning models, by improving the training and performance of these models. In another example, variants of the method can improve the performance of in-vehicle hardware with integrated computational modules (e.g., system-on-chip computer vision systems), by reducing the computational load of processors, enabling lower power operation, and similar improvements.

Fourth, variants of the method can solve problems necessarily rooted in computer and machine technology. For example, variants of the method can enable efficient generation of high entropy data for training machine-learning-based models (e.g., computer vision neural networks). In another example, variants of the method can enable the training of vehicle control models based on supervised learning (e.g., detecting expert driving behavior at a vehicle system, recording image data associated with the expert driving behavior, and training an image-based control model using the recorded image data associated with the expert driving behavior).

Figure 3:
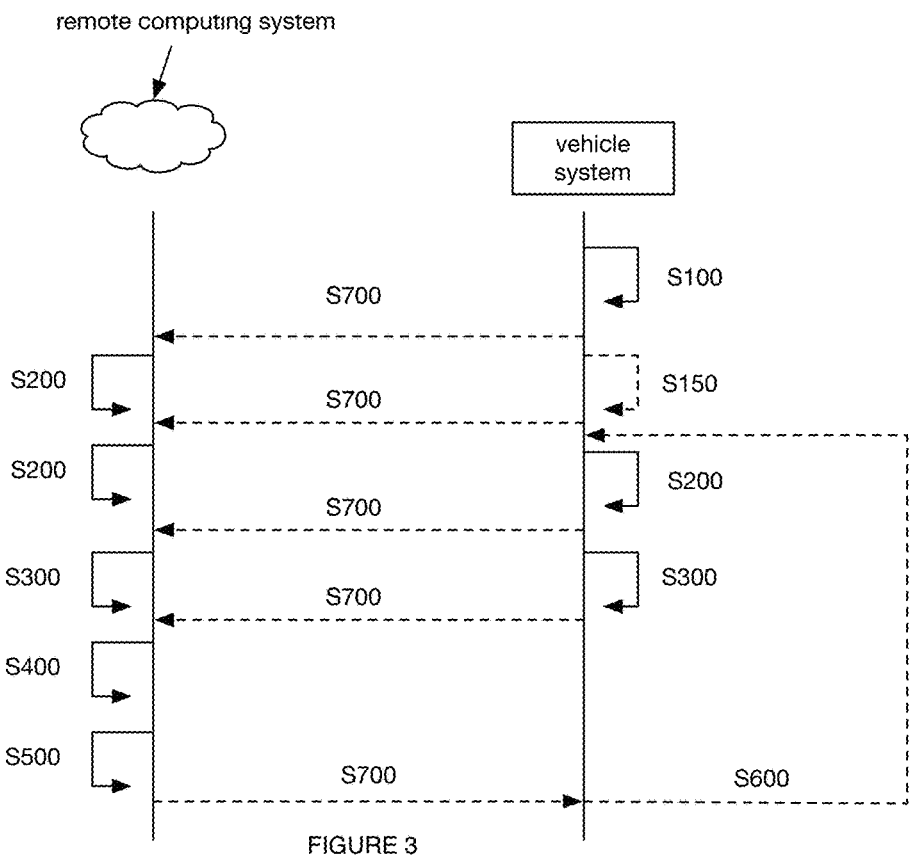
FIG. 3 depicts a flowchart of an example implementation of the method for image analysis.
Figure 4:
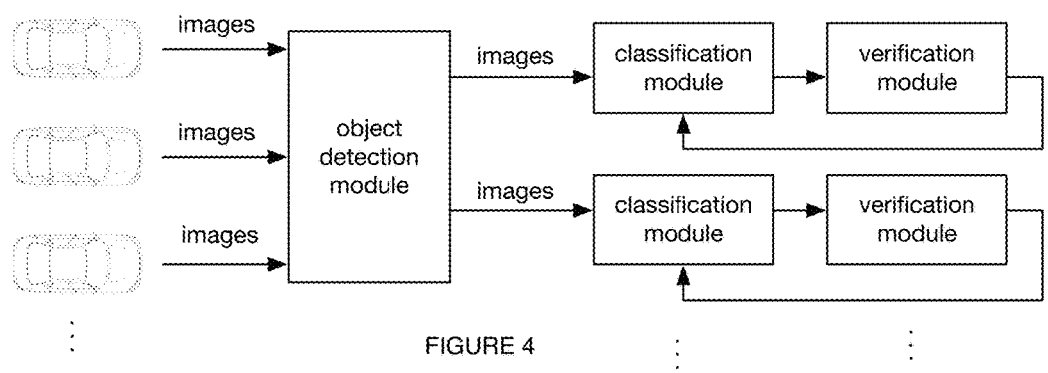
FIG. 4 depicts a flowchart of an example implementation of a portion of the method for image analysis.

Fifth, variants of the method can include unconventional arrangements and/or order of method blocks. For example, as shown in FIGS. 3 and 4, variants of the system and method can be implemented as a distributed computing architecture. In one such example architecture, the system includes a cascaded classifier (e.g., first and second classification and/or detection modules wherein the output of the first module is the input of the second module) is implemented such that a first stage (e.g., the first module) is executed at a vehicle system, and a second stage (e.g., the second module) is executed at a remote computing system. The second stage can be optimized based on the a priori knowledge that the data classified via the first stage was collected from a known context (e.g., a known physical location, a known roadway type, etc.) and is thus partially and intrinsically pre-labeled and/or classified.

However, the system and method can confer any other suitable set of benefits.

3. SYSTEM

Figure 2:
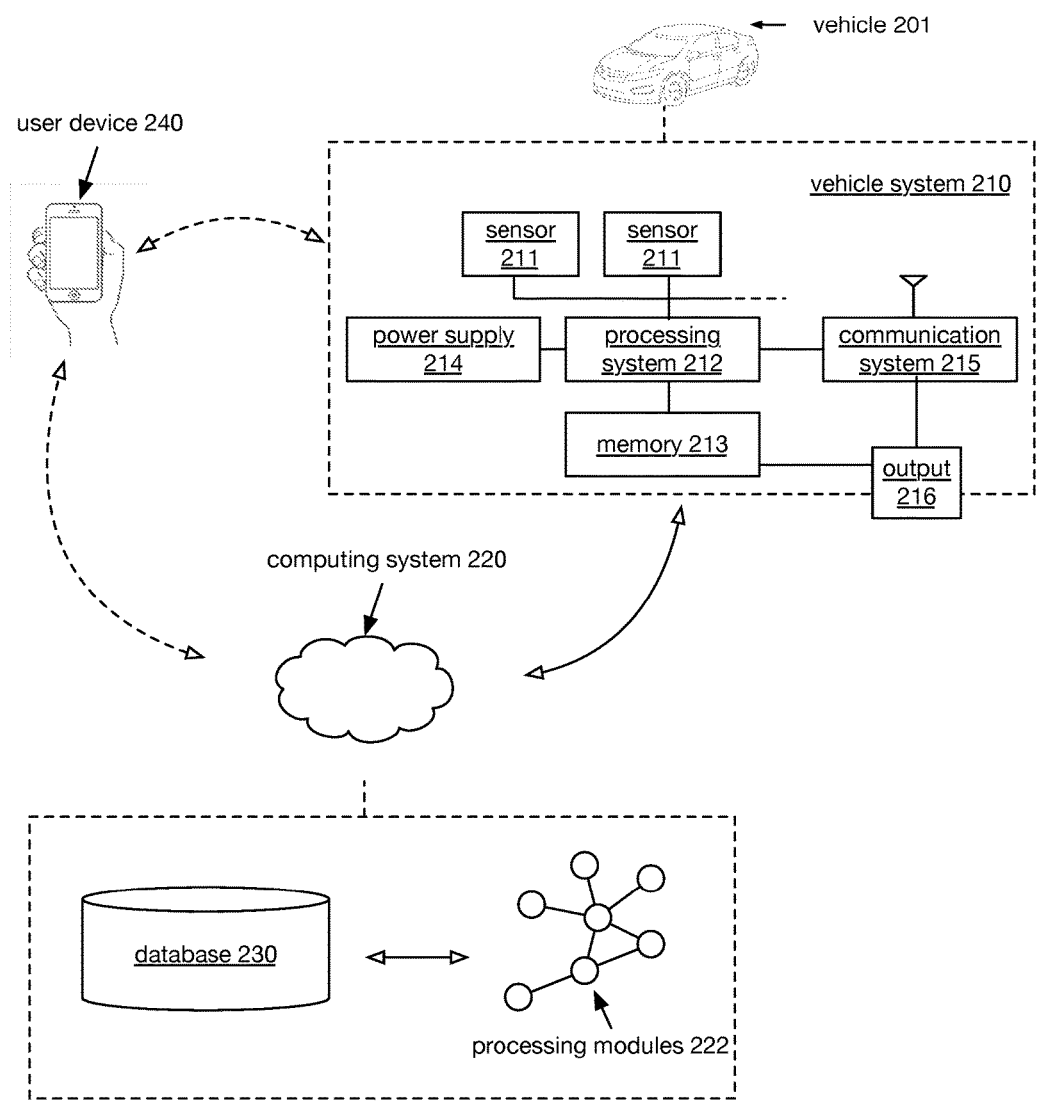
FIG. 2 depicts a schematic illustration of a variation of the system for image analysis.

As shown in FIG. 2, the system 200 can include: a vehicle 201, a vehicle system 210, a computing system 220 that includes one or more processing modules 222, and a database 230. The system can optionally include: a user client, a management client, or any other suitable client configured to run on a user device 240. However, the system can include any other suitable component. The system 200 can be operable between one or more modes. For example, the system can be operable between a continuous mode (e.g., wherein object recognition and module training is being continuously and iteratively performed), and a batch mode (e.g., wherein object recognition and verification is performed until a threshold retraining condition is reached, and the modules are subsequently retrained before the retrained modules are deployed to vehicle systems to resume object recognition). The operation mode can be selected: automatically, manually, dynamically (e.g., based on the operation or driving context), statically (e.g., based on the entity using the system 200), or otherwise determined.

The vehicle 201 preferably includes a car (e.g., a compact sedan), but can additionally or alternatively include any suitable type of vehicle (e.g., a pickup truck, a semi-truck or tractor, a plane, a train, a helicopter, a sidewalk-navigating robot, etc.).

The vehicle system 210 (e.g., vehicle sensor system) functions to record image data during operation of the vehicle 201 (e.g., during a driving session). The vehicle system can also function to record image sequences (e.g., video) during vehicle operation. The vehicle system can also function to record external imagery (e.g., via a front-facing camera), and/or to record internal imagery (e.g., via an inward-facing camera). The vehicle system can additionally or alternatively: record auxiliary data (e.g., accelerometer data, IMU data, GPS data, RTK data, etc.), uniquely identify a vehicle, store data associated with the vehicle (e.g., feature values for frequent drivers of the vehicle, clusters for vehicle drivers, vehicle operation logs, etc.), process the sensor signals into feature values, record driver biometric data (e.g., via a paired wearable device, heartrate data, blood alcohol content values, pulse oximetry data, etc.), and/or perform any other suitable functionality. The vehicle system 210 can implement and/or execute one or more processing modules, and can additionally or alternatively transmit and receive data, instructions, and any other suitable information.

As shown in FIG. 2, the vehicle system can include: a set of sensors 211, a processing system 212, memory 213, a power supply 214, a communication system 215, and outputs 216. The vehicle system can additionally or alternatively include location systems, and any other suitable component. The vehicle system is preferably arranged within a cabin of the vehicle 201, and more preferably rigidly mounted to the vehicle at a position within the cabin (e.g., to the rearview mirror, the dashboard, etc.). However, the vehicle system 210 can be otherwise suitably arranged.

The sensors 211 of the vehicle system function to acquire sensor signals (e.g., image data). The sensors can additionally or alternatively acquire auxiliary signals or data over the course of a driving session, acquire signals indicative of user proximity to the vehicle and/or vehicle system, or record any other suitable set of signals and other data. The sensor signals can be timestamped (e.g., with the sampling time), geotagged, associated with the vehicle system identifier, associated with the user identifier, associated with the vehicle identifier, or associated with any suitable set of data. The sensor signals can be immediately analyzed and discarded, stored temporarily on the vehicle system (e.g., cached), stored substantially permanently on the vehicle system, sent to the remote computing system or user device, streamed to the remote computing system or user device, or otherwise stored. The set of sensors can include: cameras (e.g., recording wavelengths within the visual range, multispectral, hyperspectral, IR, stereoscopic, wide-angle, wide dynamic range, etc.), orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, or any other suitable type of sensor. The vehicle system can include one or more sensors of same or differing type. In one variation, the vehicle system includes a camera, wherein the vehicle system is configured to mount to a vehicle interior such that the camera is directed with a field of view encompassing a portion of the vehicle interior, more preferably the volume associated with a driver's position but alternatively or additionally a different physical volume.

The sensors of the vehicle system (e.g., vehicle sensor system) can also function to acquire signals indicative of a driving session and/or driving operations (e.g., driving characterization data, vehicle operational data, driving session data, etc.). Driving characterization data and/or vehicle operational data can include vehicle outputs (e.g., engine output power, transmission gear state, throttle and/or accelerator pedal position, fuel injection parameters, voltage and/or current values of any vehicle components operating on electrical power, brake lever position, brake pedal position, brake caliper position, etc.), vehicle kinematics (e.g., acceleration, velocity, position, planned traversal path, current traversal path, past traversal path, etc.), vehicle inputs (e.g., accelerator pedal position, steering wheel position, gear shifter position, door position, such as open or closed, etc.), driver parameters (e.g., whether the driver is distracted or not, a distraction level of a distracted driver, a head position of a driver, etc.), vehicle cabin parameters (e.g., noise levels, number of passengers in the vehicle, etc.), and any other suitable data related to the operation of a vehicle.

The processing system 212 of the vehicle system can function to perform all or part of the analyses (e.g., execute one or more processing modules), control vehicle system operation (e.g., select the vehicle system operation mode), or perform any other suitable computational task. The processing system can be a CPU, GPU, microprocessor, tensor processing unit (TPU), or any other suitable processing unit. The memory can include volatile memory, nonvolatile memory, optical memory, organic memory, or any other suitable computing memory.

The power supply 214 of the vehicle system functions to power the active components of the vehicle system. The power supply can be a wired connection to the vehicle (e.g., an OBD port plug, connection to the vehicle bus, connection to the vehicle battery, etc.), wireless connection to the vehicle (e.g., inductive charger), a battery (e.g., secondary or rechargeable battery, primary battery, etc.), energy harvesting system (e.g., solar cells, piezoelectric systems, pyroelectrics, thermoelectrics, etc.), or any other suitable system.

The communication system 215 of the vehicle system functions to communicate data between the vehicle system and the user device, the remote computing system, the vehicle, or any other suitable endpoint. The communication system can include one or more radios or any other suitable component. The communication system can be a long-range communication system, a short-range communication system, or any other suitable communication system. The communication system can facilitate wired and/or wireless communication. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof.

The output(s) 216 of the vehicle system functions to present data, emit signals, or otherwise output information. The outputs can include: displays (e.g., LED display, OLED display, LCD, etc.), audio speakers, lights (e.g., LEDs, white light emitters, red light emitters, IR light emitters, etc.), tactile outputs (e.g., a tixel system, vibratory motors, etc.), or any other suitable output.

The location system of the vehicle system functions to acquire a vehicle system location. The vehicle system location can be an absolute geographic location, a relative geographic location, or any other suitable physical or virtual location. The location system can include a GPS unit, a GNSS unit, a triangulation unit that triangulates the device location between mobile phone towers and public masts (e.g., assistive GPS), a Wi-Fi connection location unit, a WHOIS unit (e.g., performed on IP address or MAC address), a GSM/CDMA cell identifier, a self-reporting location information, or any other suitable location module.

The vehicle system can additionally include a housing, which functions to enclose, protect, and/or retain the vehicle system components. The housing can additionally define a mounting mechanism (e.g., clip, suction cup, magnet, etc.) configured to mount the vehicle system to a vehicle.

The vehicle system can be used with one or more vehicles, wherein the vehicle system can uniquely identify the vehicle that it is currently associated with. The vehicle system can additionally or alternatively store information associated with said vehicle. In a first variation, the vehicle system is specific to a single vehicle, and can be statically mounted to the vehicle (e.g., within the vehicle, outside of the vehicle, etc.). In a first embodiment, the vehicle system identifier is used as a proxy for the vehicle identifier. In a second embodiment, the vehicle system can store a vehicle identifier (e.g., license plate, VIN number, etc.). However, the vehicle system can otherwise uniquely identify and/or store information associated with the vehicle. In a second variation, the vehicle system can be associated with (e.g., used across) multiple vehicles, wherein the vehicle system can be removably coupled to the vehicles. In a first embodiment, the vehicle system can read (e.g., through the communication system) a vehicle identifier from the vehicle (e.g., through a connection to the vehicle bus, through an OBD port, from a vehicle RFID tag or beacon, etc.), from a mount statically mounted to the vehicle, or from any other suitable data source. In a second embodiment, the vehicle system can infer a vehicle identifier for the vehicle, based on sensor signals (e.g., location, ambient light, temperature, etc.). For example, the vehicle system can infer that it is associated with (e.g., located within) a vehicle when the measured location is substantially similar to (e.g., within a threshold distance of) the vehicle location (e.g., known or estimated, based on past driving history). However, the vehicle system can be otherwise associated with a set of vehicles.

The remote computing system of the system functions as a central management system for one or more vehicle systems, users, clients, or other entities. The remote computing system can optionally function as a repository (e.g., central repository) and store user information (e.g., biometric database, preferences, profiles, accounts, etc.), process the sensor signals (e.g., image data), perform all or part of the analyses, implement and/or execute all or a portion of the processing modules, or perform any other suitable computational task. The remote computing system is preferably remote from the vehicle system, but can alternatively be collocated with the vehicle system or otherwise arranged. The remote computing system can be a set of networked servers, a distributed computing system, or be any other suitable computing system. The remote computing system can be stateful, stateless, or have any other suitable configuration.

The processing modules of the system function to perform object recognition tasks based on image data recorded by the sensors. The processing modules can be entirely or partially stored on: the remote computing system, the user device(s), the vehicle system(s), or any other suitable computing system. The processing modules can be centralized, decentralized, or otherwise configured. When stored on a remote repository (e.g., a repository remote from the central repository), the remote repositories can be updated at a predetermined frequency (e.g., every night, every hour, etc.), upon occurrence of a predetermined event (e.g., upon update generation, upon connection to a predetermined network type, such as connection to a WiFi network, connection to a user device with cellular data, etc.), or at any other suitable time.

The set of processing modules preferably includes at least one object detection module, classification module, and verification module. The set of processing modules can optionally include a tracking module, and any other suitable module for processing image data. Each of the above modules can utilize one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module can additionally or alternatively utilize one or more of: object model-based detection methods (e.g., edge detection, primal sketch, Lowe, recognition by parts, etc.), appearance-based detection methods (e.g., edge matching, divide and conquer, grayscale matching, gradient matching, histograms of receptive field responses, HOG, large modelbases), feature-based detection methods (e.g., interpretation trees, hypothesize and test, pose consistency, pose clustering, invariance, geometric hashing, SIFT, SURF, bag of words representations, Viola-Jones object detection, Haar Cascade Detection), genetic algorithms, background/foreground segmentation techniques, or any other suitable method for computer vision and/or automated image analysis. Each module can additionally or alternatively be a: probabilistic module, heuristic module, deterministic module, or be any other suitable module leveraging any other suitable computation method, machine learning method, or combination thereof.

Each module can be validated, verified, reinforced, calibrated, or otherwise updated based on newly received, up-to-date measurements; past measurements recorded during the operating session (e.g., driving session); historic measurements recorded during past operating sessions; or be updated based on any other suitable data. Each module can be run or updated: once; at a predetermined frequency; every time the method is performed; every time an unanticipated measurement value is received; or at any other suitable frequency. The set of modules can be run or updated concurrently with one or more other modules, serially, at varying frequencies, or at any other suitable time. Each module can be validated, verified, reinforced, calibrated, or otherwise updated based on newly received, up-to-date data; past data; or be updated based on any other suitable data. Each module can be run or updated: in response to determination of an actual result differing from an expected result; or at any other suitable frequency.

The object detection module functions to detect that an object is depicted in image data (e.g., in an image frame, in an image sequence). In a first variation, the system includes an object detection module for each of a predetermined set of object types. In a second variation, the system includes a global object detection module that detects any of the predetermined set of object types within image data. The output of the object detection module can include bounding boxes (e.g., drawn around all or a portion of the detected object), annotated image data (e.g., with detected objects annotated), feature vectors based on image words (e.g., embeddings), and any other suitable output.

The classification module functions to determine a class of an object (e.g., object class) depicted in image data. The object class can be determined based on extracted image feature values, embeddings, or any other suitable metric determined by the object detection module. In a first variation, the classification module can match the embedding values to a vocabulary of image words, wherein a subset of the vocabulary of image words represents an object class, in order to determine the object class of the detected object. In a second variation, the system can include one classification module for each object class, and the object class can be determined by sequentially analyzing the embeddings associated with each object class and then analyzing the results to determine the best match among the classification modules, thereby determining the object class (e.g., the class corresponding to the classification module whose results best match the image data). In a third variation, the system includes a cascaded classifier that is made up of hierarchical classification modules (e.g., wherein each parent classification module performs a higher level classification than a child classification module). The output of the classification module can include bounding boxes (e.g., drawn around all or a portion of the classified object), annotated image data (e.g., with objects annotated with a text fragment corresponding to an associated object class), feature vectors based on image words (e.g., embeddings), and any other suitable output.

In a first specific example of the classification module, the system includes a cascaded sequential classifier wherein a first classification module (e.g., a first module) is executed at the vehicle system, and a second classification module is executed at a remote computing system. In this example, the first classification module determines an object class for an object depicted in the image data, and the second classification module determines an object subclass for the object.

In a second specific example of the classification module, a first version of the classification module having a first complexity is executed at the vehicle system, and a second version of the classification module having a second complexity is executed at the remote computing system, wherein the second complexity is greater than the first complexity. In this and related examples, the complexity of the module can be represented by a number of artificial neurons in an artificial neural network, wherein the module is implemented as an artificial neural network. In alternative examples, the complexity of the module can be represented by a dimensionality of the model implemented by the module. In further alternatives, the complexity of the module can be represented by the size of an image word vocabulary. However, module complexity can be otherwise suitably represented.

Figure 5:
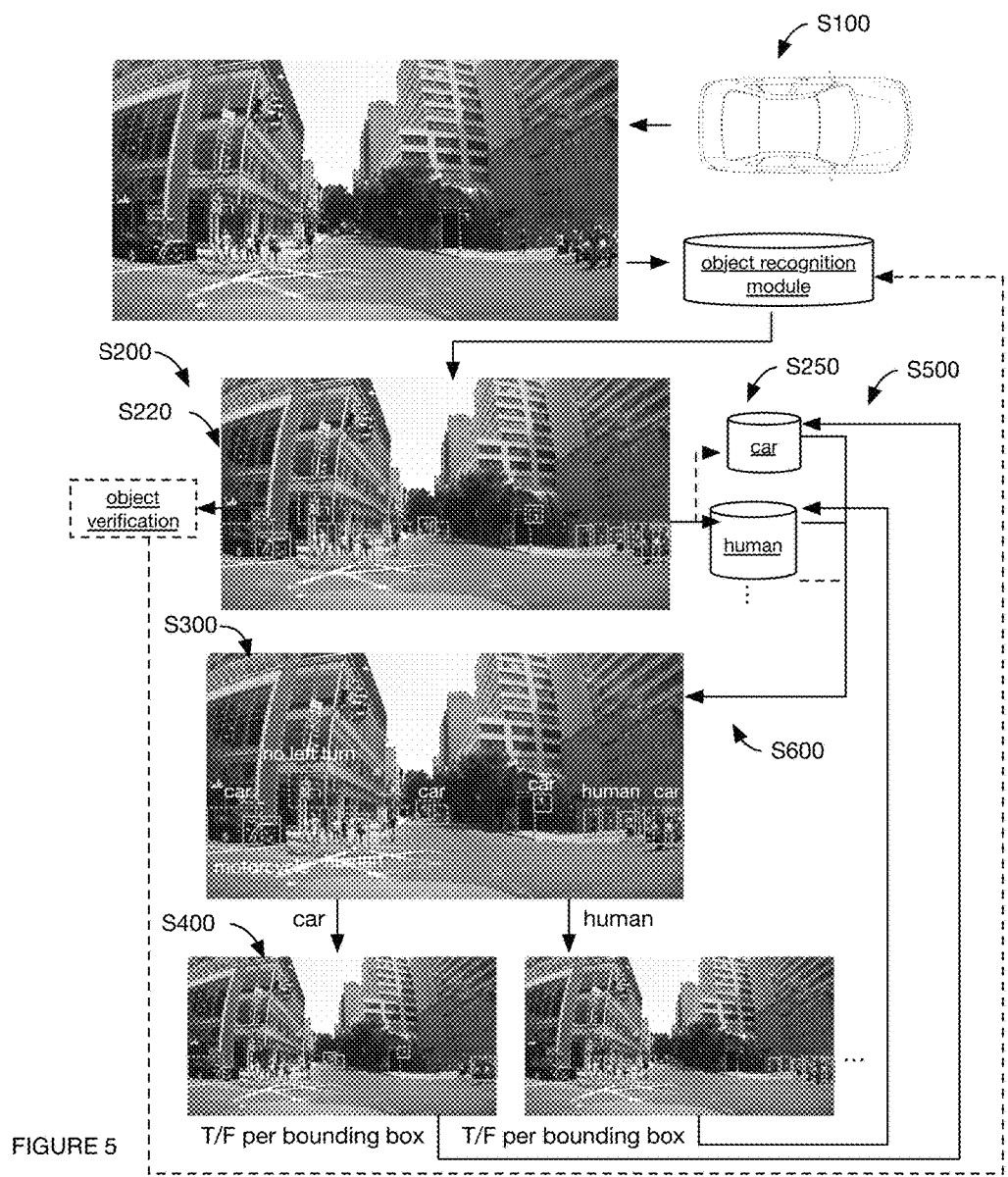
FIG. 5 depicts a flowchart of an example implementation of a portion of the method for image analysis.

The verification module functions to label recognized objects (e.g., detected objects, classified objects, etc.) as correctly or incorrectly recognized. Labeling is preferably performed automatically, but can alternatively be performed semi-automatically or manually (e.g., at a user interface). Accordingly, variations of the verification module can include a user interface that enables a user to interact with renderings of the image data and provide a user selection, wherein the user selection functions to label the objects as correctly or incorrectly recognized. Labeling preferably includes labeling the image data as including at least one of a false positive, false negative, true positive, and true negative result (e.g., detection, classification, etc.). In an example implementation, as shown in FIG. 5, labeling can be performed for each bounding box defined in an image frame. In another example implementation, labeling can be performed for an entire image based on at least one bounding box defined in the image including a false positive and/or false negative detection or classification. However, labeling can include otherwise suitably labeling the image data with any suitable label.

In some variations of the system, the system can include one verification module per object detection module and/or classification module. In additional or alternative variations, the system can include a single verification module at which the results and/or outputs of each of the object detection modules and/or classification modules are verified. However, the system can include any suitable number of verification modules having any suitable correspondence to other processing modules of the system.

The system can additionally include a tracking module that functions to predict trajectories of objects in image data. The tracking module can also function to reduce the number of images that require de novo object recognition to be performed, by tracking previously detected and/or classified objects between frames in a sequence of image frames. In a first variation, object tracking is performed via point tracking, such as by deterministic methods (e.g., with parametric constraints based on the object class of an object) or statistical methods (e.g., Kalman filtering). In a second variation, object tracking is performed via kernel filtering and kernel tracking, such as using template-based methods or multi-view appearance methods. In a third variation, object tracking is performed via silhouette tracking, such as using shape matching, edge matching, and/or contour tracking. However, object tracking and trajectory prediction and/or determination can be determined using motion analysis or otherwise suitably performed via any suitable method or technique.

The system can additionally include one or more databases 230, which function to store data (e.g., image data, image labels, model parameters, feature values, embedding values, relative embedding values, etc.). The databases can additionally or alternatively store any suitable data types. The databases can also function to enable data retrieval (e.g., by processing modules); accordingly, the databases can structure stored data to facilitate retrieval according to any suitable metadata parameters (e.g., recency, contextual salience, etc.). The databases can be entirely or partially stored on: the remote computing system, the user device(s), the vehicle system(s), or any other suitable computing system. The databases can be centralized, decentralized, or otherwise configured. The databases can be associated with an entity (e.g., insurance company, fleet company, etc.), associated with a set of social networking systems, or otherwise associated.

The databases can be updated (e.g., with new information, adjusted values, etc.) upon occurrence of an update event, or at any other suitable time. In one variation, the database is updated with new feature values and/or vectors for an object in response to the conclusion of a driving session (e.g., wherein turning off the engine or motor of a vehicle represents an update event). In a second variation, a scheduling database is updated to reflect that a user has been detected driving a vehicle during a predetermined time period (e.g., a time period in which the user is scheduled to drive, to credit the user for driving according to a predetermined schedule). However, any suitable databases can be otherwise suitably updated at any suitable time and/or in any suitable manner.

The client of the system functions to display notifications, display information, receive user inputs (e.g., associated with actions on the vehicle, schedule, databases, etc.), record sensor signals sampled by the user device, and/or perform any other suitable system. The client can be a native application, a browser application, an operating system application, or be any other suitable application or executable. The client preferably runs on a user device, but can alternatively run on any suitable computing system. The client can include a management client (e.g., enabling account control, override authority, monitoring systems, etc.), a driver client (e.g., providing maps, dispatcher information, preferences, etc.), a passenger client, and/or any other suitable client for any other suitable entity.

The user device is preferably associated with a user through a user identifier (e.g., user account), but can alternatively or additionally be associated with the vehicle, management entity, or with any other suitable entity. The user device can be a mobile phone, laptop, smartphone, tablet, smartwatch, wearable device, or any other suitable mobile device. The user device is preferably connected to the server, wherein the connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system.

The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

4. METHOD

As shown in FIG. 1, the method for image analysis includes: recording image data at the vehicle system S100; recognizing an object based on the image data S200; annotating the image data based on the object S300; verifying the annotation within the image data S400; training a module based on the verified image data S500; and executing the trained module to recognize objects in additional image data S600. The method can optionally include: recording auxiliary data at the vehicle system S150; transmitting data between the vehicle system and remote computing system S700; and tracking an object trajectory based on image data S800. The method can be performed in real or near-real time (e.g., as the image data is recorded), after a delay, or at any suitable time. The method can be performed a predetermined number of times for a driving session, iteratively performed at a predetermined frequency for a driving session, or performed at any suitable time. Multiple instances of the method can be concurrently performed for multiple concurrent driving sessions (e.g., for different vehicles, via different vehicle systems). However, any suitable number of method instances can be performed at any suitable time.

Block S100 functions to obtain imagery of the surroundings of the vehicle for analysis in subsequent blocks of the method 100. Block S100 can also function to obtain imagery of the internal environment of the vehicle (e.g., the cabin interior). Block S100 is preferably performed by the vehicle system, and more preferably by one or more cameras of the vehicle system. For example, the vehicle system can include a forward-facing camera, an inward-facing camera, and/or a 360° camera at which the imagery is recorded. Block S100 can additionally or alternatively recording video at a video camera, a burst of images at a burst camera, and a single frame at a single frame camera. However, Block S100 can be implemented via any suitable imaging device.

The image data recorded in Block S100 can include a single image (e.g., frame), an image sequence, a video, a burst, and any other suitable image data or sequence of images of any suitable length. Image data can be recorded constantly (e.g., continuously), periodically, randomly, upon occurrence of a trigger event (e.g., a driving event, an auxiliary data value or signal exceeding a threshold value, etc.), and/or with any other suitable temporal characteristics.

The method can include Block S150, which includes recording auxiliary data at the vehicle system. Block S150 functions to obtain auxiliary data (e.g., additional data to the image data recorded in Block S100) for analysis and/or for use as the basis for analyses in subsequent blocks of the method 100. Auxiliary data can be used as the basis for any other blocks of the method 100 (e.g., determining an object class based on auxiliary data and selecting a classification module associated with the determined object class). Block S150 is preferably performed by the vehicle system, and more preferably by one or more sensors of the vehicle system, which can include motion sensors (e.g., multi-axis and/or single-axis accelerometers, gyroscopes, etc.), location sensors (e.g., GPS data collection components, magnetometer, compass, altimeter, etc.), optical sensor (e.g., image sensors, light sensors, etc.), audio sensors, temperature sensors, volatile compound sensors, weight sensors, humidity sensors, depth sensors, location sensors, inertial sensors (e.g., accelerators, gyroscope, magnetometer, etc.), impedance sensors (e.g., to measure bio-impedance), biometric sensors (e.g., heart rate sensors, fingerprint sensors), pressure sensors, flow sensors, power sensors (e.g., Hall effect sensors), vehicle sensor, and/or or any other suitable sensor. Vehicle sensor data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), and/or any other suitable vehicle data. For example, vehicle sensor data can provide information on the status of a vehicle before/during/after an accident (e.g., by collecting airbag deployment data, ABS or other braking system data, engine temperature data, etc.).

In a first specific implementation of the method, Block S150 includes determining that the vehicle is navigating surface streets based on analysis of IMU data (e.g., via pattern matching analysis), and the method includes executing a pedestrian classification module in response. In a second specific implementation, Block S150 includes determining, using a clock of the vehicle system, that the driving session is occurring within a scheduled driving time window corresponding to a specific driver, and the method includes executing a facial recognition module in response (e.g., using an inward-facing camera of the vehicle system).

In a third specific implementation, the method includes determining an object class based on a vehicle context parameter, wherein Block S150 includes determining the vehicle context parameter, and wherein the vehicle context parameter indicates the roadway type (e.g., highway, surface streets, freeway entrance or exit, etc.) that the vehicle is driving upon. In a fourth specific implementation, the vehicle system includes an accelerometer that outputs an accelerometer signal, Block S150 includes recording the accelerometer signal, and the method includes recording an image sequence in response to the accelerometer signal amplitude exceeding a threshold amplitude. However, Block S150 can include collecting any suitable auxiliary data in any other suitable manner, and using the auxiliary data as a basis for other method blocks in any other suitable manner.

The method includes Block S200, which includes recognizing an object based on the image data. Block S200 functions to determine that an object is depicted in the image data and to determine the one or more object classes to which the object belongs. Recognizing objects can include detecting (e.g., scanning one or more images for a specific condition), identifying (e.g., recognizing an individual instance of an object), classifying (e.g., determining an object class or type for a detected object), subclassifying objects or other image elements, and/or otherwise determining whether a set of images includes an object(s), feature(s), or activity(s). Accordingly, Block S200 can include Block S220, which includes detecting an object based on the image data, and Block S250, which includes classifying the object based on the image data. Block S200 is preferably performed by one or more processing modules (e.g., object detection modules, classification modules, etc.), but can be otherwise suitably performed by any suitable system component or module. Object recognition (e.g., detection, classification, etc.) can be performed via various techniques, including: edge detection, primal sketch, generalized cylinders, geons, template/exemplar comparisons, edge matching; other appearance-based techniques such as divide-and-conquer search, greyscale matching, gradient matching, histograms of receptive field responses, large modelbases; feature based methods such as interpretation trees, hypothesize-and-test, pose consistency and alignment, pose clustering, invariance, geometric hashing, scale-invariant feature transforms (SIFT), speeded up robust features (SURF), bag-of-words models, histogram representations based on independent image features; genetic algorithms, other approaches such as 3D cues, internet image data leveraging, biologically inspired object recognition, artificial neural networks and deep learning, context-based techniques, explicit and implicit 3D object models, fast indexing, global scene representations, gradient histograms, grammars, intraclass transfer learning, reflectance, shading, template matching, texture, topic models, unsupervised learning, window-based detection, deformable part models, Bingham distribution; and any other suitable object recognition techniques.

Block S200 can include Block S220, which includes detecting an object based on the image data. Block S220 functions to determine that an object is depicted at all in image data (e.g., versus a flat field or an image frame devoid of relevant objects). Block S220 can also function to discriminate between an object and image background. Block S220 is preferably performed prior to classifying an object into an object class, but can additionally or alternatively be performed simultaneously (e.g., as a single-step object recognition module). Block S220 is preferably performed by an object detection module executing at the vehicle system, as described above in the System section. However, Block S220 can alternatively be performed by an object recognition module (or any other suitable module) executing at a remote computing system. In further alternatives, Block S220 can be performed by two copies of an object detection module, wherein one copy executes at the vehicle system and another copy executes at the remote computing system. Block S220 can result in modified image data that includes labels of detected objects embedded within the image. In a first variation, Block S220 can include generating a frame that has metadata embedded (e.g., tags) designating objects. In a second variation, the method can include transmitting the result of Block S220 to a remote computing system based on an object being recognized (e.g., in Block S220), wherein no metadata is added because the image data is implicitly designated as including a detected object by virtue of having been transmitted. However, Block S220 can include otherwise suitably detecting objects in image data.

The method can include Block S250, which includes classifying the object based on the image data. The object is preferably the object detected as a result of Block S220, but can additionally or alternatively include an object that is classified de novo. Block S250 functions to determine an object class of an object depicted by image data. An object class is preferably a category of object in which the detected object can be categorized (e.g., a vehicle, a road sign, a road feature, etc.). Object classes can be hierarchal; for example, an object can belong to the 2004 Honda Civic EX class, which can be a subclass of both the Honda Civic class and 2004 Model Year class, which can each be subclasses of the Compact Car class, which can be a subclass of the Vehicle class. However, object classes can be otherwise suitably semantically arranged. Block S250 can be performed sequentially with other blocks of the method 100, as multiple nested and/or hierarchical instances (e.g., a cascaded classifier), in a single-step (e.g., via an all-in-one classification module), and/or with any other suitable architecture. Block S250 is preferably performed subsequent to object detection (e.g., Block S220), but can alternatively be performed simultaneously with object detection as a single step object recognition module that includes both detection and classification. Block S250 is preferably performed by a classification module, which, in a first variation, executes at the vehicle system and, in a second variation, executes at the remote computing system. In an alternative variation, Block S250 is performed at two versions of the classification module, a first version executing at the vehicle system and a second version executing at the remote computing system. However, Block S250 can be otherwise suitably performed.

Block S250 can be performed based on image features, feature values in the image data (e.g., extracted as a result of Block S220), relationships between feature values, embeddings, and any other suitable characteristics of the image data. Block S250 can generate modified image data that includes labels of objects depicted within the image with an object class. In a first variation, Block S250 results in a frame that has metadata embedded (e.g., tags) that designate the class of each object. In a second variation, the method can include transmitting the result of Block S250 to a remote computing system based on an object being classified (e.g., in Block S250), wherein no metadata is added because the image data is implicitly designated as including a classified object by virtue of having been transmitted.

In a first specific implementation of Block S200, the system includes a first and second module that are a first and second level of a cascaded classification system. In one example of this implementation, the first module is an object detection module and the second module is a classification module. However, related examples can include any suitable modules arranged in any suitable order.

In a second specific implementation, Block S200 includes subclassification of the classified object. Accordingly, in this implementation, Block S200 includes automatically classifying the classified object by assigning a second object class to the classified object with a third module to generate a subclassified object (e.g., classifying a Honda Civic object as a 2004 Honda Civic EX object).

The method can optionally include classifying the object and/or a driver action (e.g., driving through an intersection, turning, etc.) based on a driver score and/or driver actions. In one example, a detected traffic light can be associated with a green state or "go" state when a good driver (e.g., driver with a high driver score, as determined based on historic driver actions determined from kinematic measurements or other metrics) drives through the intersection while the traffic light is detected. This can be useful when the analyses are determined using grayscale images (e.g., HOG). However, the object and/or driver actions can be otherwise classified or processed based on the driver score.

The method includes Block S300, which includes annotating the image data based on the object. Block S300 functions to modify the image data to include an indication of the recognized (e.g., detected, classified, etc.) object. The modified image can include a new image, or the original image with a new overlay, adjustment, or other suitable annotation. Block S300 can, in variations, include: defining a bounding box about an object (e.g., a detected object) S310; and modifying the image with the bounding box S320. In additional or alternative variations, Block S300 can include tagging the object with a metadata tag that includes object recognition data (e.g., the object class of the object). However, Block S300 can include otherwise suitably annotating the image data based on the result(s) of Block S200 or any other suitable basis.

The method includes Block S400, which includes verifying the annotation within the image data. Block S400 functions to determine whether the object was correctly recognized based on the annotation made to the image data. Block S400 preferably includes labeling the image data S410, and can optionally include user-input based labeling S405; and automatically determining a horizon in the image data and labeling based on the horizon location relative to depicted object location S420. Block S400 can additionally or alternatively include any other suitable sub-Blocks. Block S400 is preferably performed by the verification module of the system, but can be otherwise suitably performed by any suitable system element or component. In a first variation, Block S400 is performed by a user at a user interface of the verification module. In a second variation, Block S400 is automatically performed by a trained verification (or other processing) module; the trained verification module can be trained using different image data (e.g., pre-labeled image data), different architectures (e.g., using symbolic processes and other deterministic processes instead of an artificial neural network, using a high accuracy but slower and/or less computationally efficient process, etc.), or otherwise suitably trained.

Block S400 can include labeling the image data S410, which functions to assign at least one of a false positive, false negative, true positive, and true negative label to the image data. In variations, a false positive assignment includes a condition in which an object has been incorrectly recognized (e.g., an object was detected as existing within an image frame where no object in fact exists, an object within an image sequence was classified as belonging to an object class to which it does not in fact belong, etc.); a false negative assignment includes an object that was not detected and/or classified within image data, wherein in fact an object and/or an object of the classified object class is present within the image data; a true positive assignment corresponds to an object having been correctly detected and/or classified; and a true negative assignment corresponds to an image having no object detection and/or classification, wherein in fact no object and/or object of the classified class is depicted.

A first variation of Block S410 includes labeling a bounding box defined about an image region within a single image frame (e.g., as a false positive). A second variation of Block S410 includes labeling an image sequence based on a single frame of the sequence (e.g., the first frame, the middle frame, the last frame, etc.). Related variations of Block S410 include labeling an image sequence based on a plurality of frames (e.g., a number of frames of the sequence above a threshold number meet a predetermined condition, such as a number of false positives and/or false negatives), and/or labeling a frame or image sequence based on a predicted trajectory of an object across multiple frames.

Figure 6:
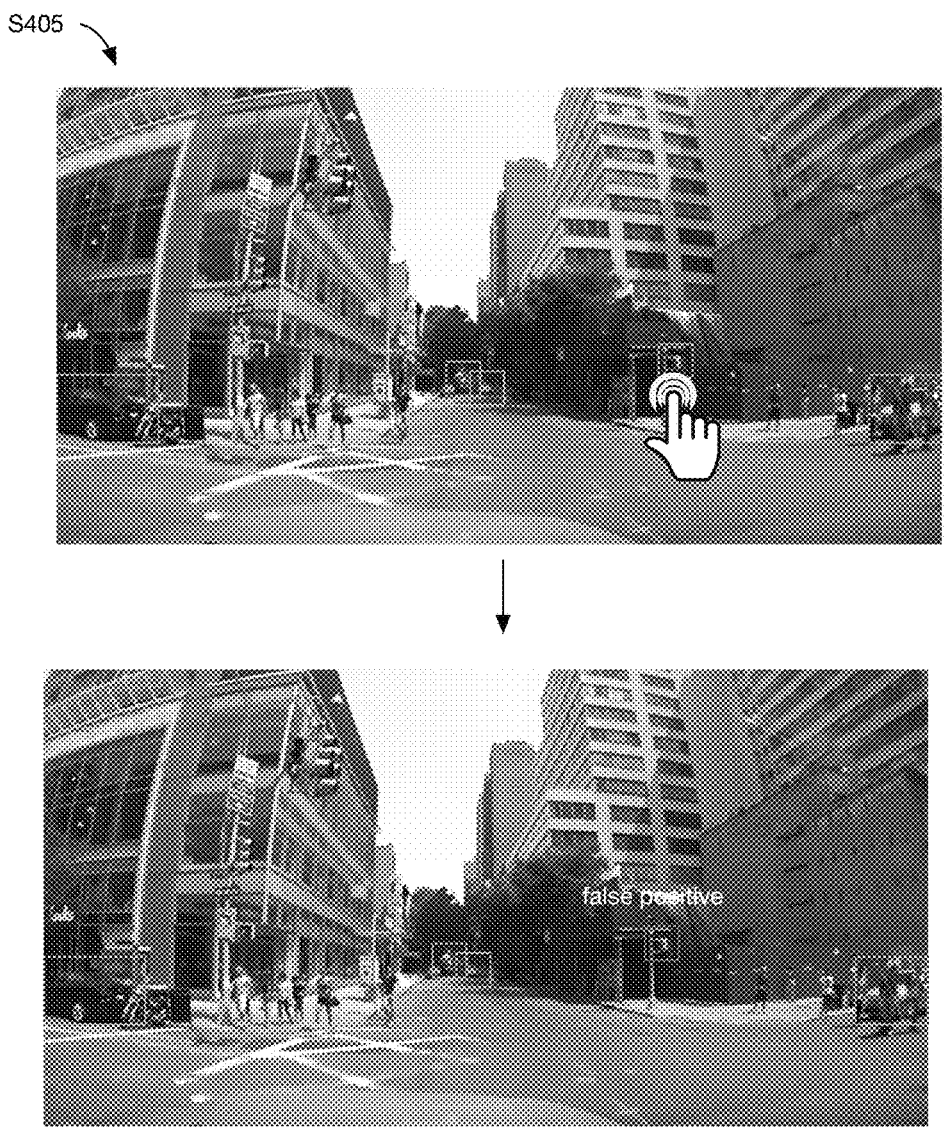
FIG. 6 depicts an illustration of an example implementation of user-based labeling in a variation of the method for image analysis.

Block S400 can optionally include Block S405, which includes user-input based labeling. Block S405 functions to enable manual verification of accurate object recognition by a user. Block S405 can include rendering image data including annotations at a user interface; the rendered image data can include the entire image, only the image region within the bounding box, an image region encompassing the bounding box and inclusive of adjacent image regions, and any other suitable image regions. Block S405 can also include receiving a user input at the user interface, and labeling the image data based on the user input. For example, as shown in FIG. 6, a user can click on an existing bounding box to indicate that the bounding box was drawn about an image that does not contain an appropriately recognized object, and the image data can be labeled accordingly as a false positive. In another example, the user ca draw a bounding box about an image region that contains an appropriate object, and the image data can be labeled as a false negative; in a related example, the appropriate bounding box as drawn by the user can be added to the image data (e.g., the image data can be modified with the bounding box). In another example, the user interface can be gesture based, wherein a first gesture indicates a false positive, and a second gesture indicates a false negative. However, Block S405 can otherwise include any suitable user-input based labeling.

Figure 7:
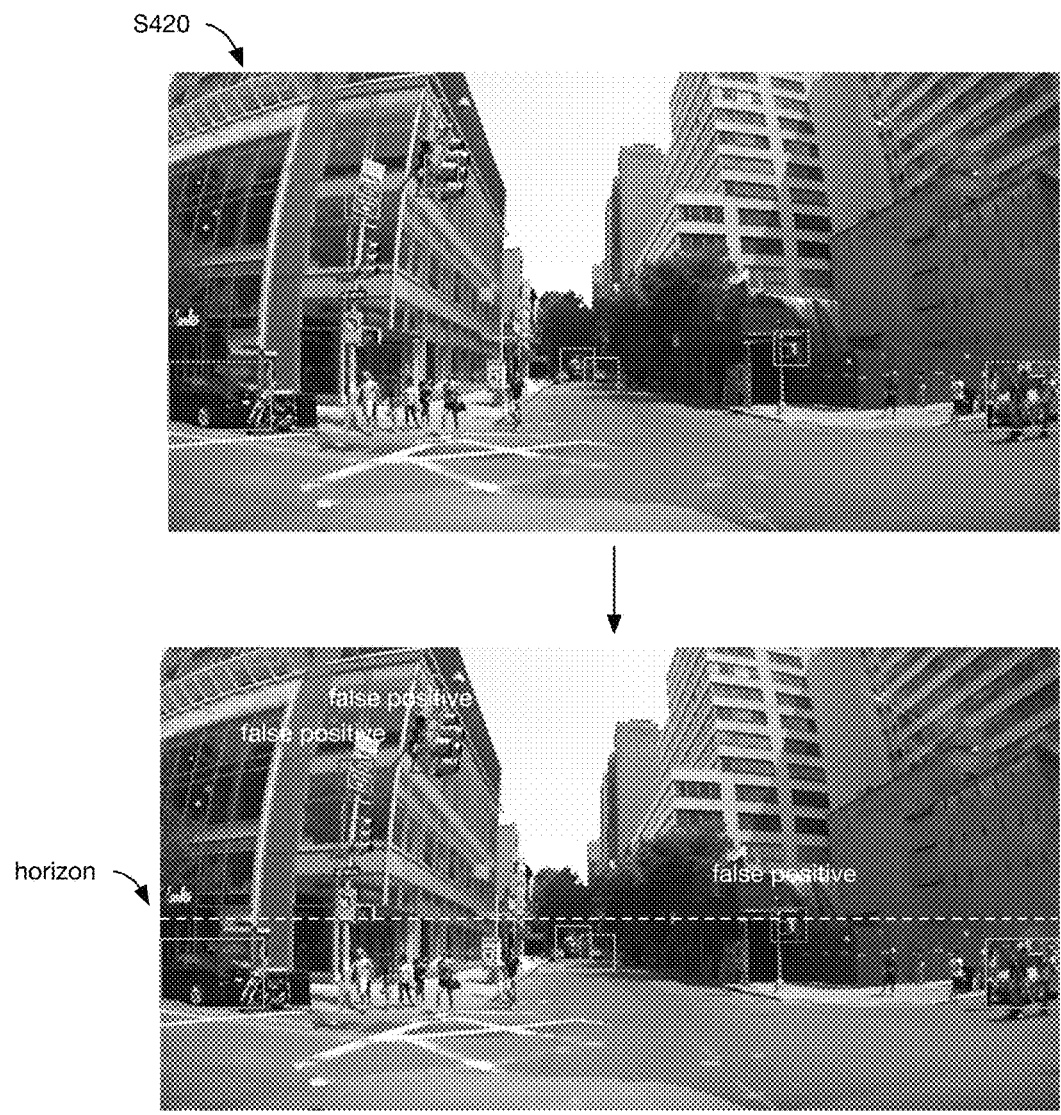
FIG. 7 depicts an illustration of an example implementation of horizon-based labeling in a variation of the method for image analysis.

Block S400 can include Block S420, which includes automatically determining a horizon in the image data and labeling the image data based on the relative location between depicted objects and the horizon. Block S420 functions to automatically label and/or score image data based on recognized objects appearing at a position within the image that is known a priori to be devoid of objects that should be appropriately recognized (e.g., above the horizon, as shown in FIG. 7). In a first variation, Block S420 can include determining a horizon line based on image fiducials. In a second variation, Block S420 can include determining a horizon line based on image segmentation, wherein the image is segmented according to a thresholded version of the image (e.g., based on relative pixel brightness) and automated edge detection (e.g., Canny edge detection). For example, Block S420 can include estimating a brightness relation via a quadric relation between an average brightness and a background brightness of each column of the image (e.g., column of the pixel array), and determining the horizon line based on a first derivative of the estimated quadric relation along each column. However, Block S420 can include otherwise determining the horizon line in any other suitable manner.

In a first specific implementation of Block S400, the verification module includes a user interface, and Block S400 includes receiving a user selection of the annotation at the user interface (e.g., a click action proximal a bounding box displayed about an object in the image); in this example, receiving the user selection labels the image data (e.g., the bounding box, the image frame, the image sequence) as a false positive. In a related example, receiving the user selection includes receiving a bounding box input (e.g., the user draws a bounding box about an object within an image displayed at the user interface) and receiving the user selection labels the image data as a false negative.

In another specific implementation of Block S400, labeling the bounding box includes automatically determining a horizon in modified image data based on image fiducials, and automatically labeling a detected object as a false positive based on at least a portion of the bounding box including pixels located above the horizon line. In an alternative specific implementation, Block S400 can include automatically calculating a score for an annotation based on its location relative to the determined horizon. The score is preferably a probability, but can additionally or alternatively be any suitable score. In this specific implementation, the image data is labeled as a false positive in response to the score falling below (or above) a threshold value.

Another specific implementation of Block S400 includes receiving a user boundary input about an image region, generating a user bounding box about the image region based on the user boundary input, and receiving the user boundary input labels the user bounding box as a false negative.

The method can include Block S500, which includes training a module based on the verified image data (e.g., labeled image data, output of Block S400, etc.). Block S500 functions to modify a module to recognize objects with an improved accuracy. Block S500 is preferably performed based on image data that has been designated as including a false positive and/or false negative detection and/or classification; however, Block S500 can be performed based on any other suitable image data having any other suitable labels.

Training is preferably implemented using supervised learning, which can be based on empirical risk minimization, structural risk minimization, generative training techniques, and any other suitable training techniques. Alternative or additional training approaches can include: analytical learning, artificial NN (e.g., CNN), backpropagation, boosting, Bayesian statistics, case-based reasoning, decision tree learning, inductive logic programming, gaussian process regression, group method of data handling, kernel estimators, learning automata, learning classifier systems, minimum message length, multilinear subspace learning, naive bayes classifier, maximum entropy classifier, conditional random field, nearest neighbor algorithm, probably approximately correct learning, ripple down rules, symbolic machine learning algorithms, subsymbolic machine learning algorithms, support vector machines, minimum complexity machines, random forests, ensembles of classifiers, ordinal classification, data pre-processing, imbalanced dataset handling, statistical relational learning, fuzzy classification algorithms, unsupervised learning, and/or any other suitable learning process.

A first variation of Block S500 includes executing the trained model at one or more processing modules to analyze (e.g., perform object recognition upon as in Block S200) labeled data (e.g., the output of the verification module) and adjusting model parameters (e.g., weights, feature vector templates, etc.) to achieve a desired output value (e.g., an accurately recognized object). This variation can include updating one or more instances of the model with the adjusted model parameters (e.g., instances of the model executing at one or more vehicle systems). However, Block S500 can include otherwise training any suitable learning model implemented at any suitable processing module in any other suitable manner.

The method includes Block S600, which includes executing the trained module to recognize objects in additional image data. Block S600 functions to utilize the improved module to execute other blocks of the method (e.g., S200, S300, S400, etc.). For example, Block S600 can include iteratively repeating Blocks S100-S500 to improve the module performance in each respective Block. Block S600 can also function to implement the trained module in a vehicle control system. For example, Block S600 can include real time object recognition and vehicle navigation based on the recognized object (e.g., detecting the object using the trained module, optionally determining the object trajectory using a second trained module, and maneuvering the vehicle into an unobstructed space to avoid a collision with the real-world object). Block S600 can include deploying instances of the trained module(s) out to vehicle systems associated with a population of vehicles to enable efficient point-of-collection image recognition, or for any other suitable purpose. However, Block S600 can include otherwise suitably executing any suitable trained modules.

The method can include Block S700, which includes transmitting data between the vehicle system and the remote computing system. Block S700 functions to enable image data transfer between the vehicle system and remote computing system. Block S700 can also function to enable model parameter transfer between the remote computing system and the vehicle system, which can in turn enable method variations in which trained modules are deployed to vehicle systems in the field to receive updated model parameters that improve the performance of processing modules executing at the vehicle systems. Block S700 is preferably performed by a communication module of the system, but can be otherwise suitably performed by any suitable component of the system (e.g., a transceiver). In a first variation, Block S700 is performed simultaneously and/or contemporaneously with other blocks of the method (e.g., image data is streamed to the remote computing system in real time or near-real time). In a second variation, Block S700 is performed sequentially between other blocks of the method (e.g., an object detection module is executed at the vehicle system, the modified image data resulting from object detection is transmitted to the remote computing system, and the classification module is executed at the remote computing system on the received image data).

In a first example of Block S700, a modified image is transmitted from the vehicle system to the remote computing system in response to the detection of an object within the image.

The method can include Block S800, which includes tracking an object trajectory based on the image data. Block S800 functions to predict the location of an object within an image based on the location of the object in a prior image (e.g., multiple prior images of a sequence of images). Block S800 can also function to reduce the number of images of an image sequence for which object recognition is performed, by tracking a previously recognized object across multiple images. Block S800 can also function to train a tracking module. Block S800 is preferably performed by a tracking module of the system, but can be otherwise suitably performed by any suitable system component.

In a first variation, Block S800 includes recognizing an object in a first frame of an image sequence, determining a center of mass (CoM) of the recognized object, recognizing the object in a second frame, determining the CoM in the second frame, computing the trajectory of the object based on a known separation in time between frames and a computed distance (e.g., in pixels, in feet, in meters) between the first and second CoM positions, and predicting the position of the CoM in subsequent frames (e.g., third, fourth, etc.) based on the computed trajectory. In other variations, Block S800 can include point tracking, such as via deterministic methods (e.g., with motion constraints associated with object class) or statistical methods (e.g., kalman filtering); kernel tracking, such as using template-based methods or multi-view appearance methods; silhouette tracking, such as using shape matching or contour tracking; or any other suitable method or technique.

Figure 10:
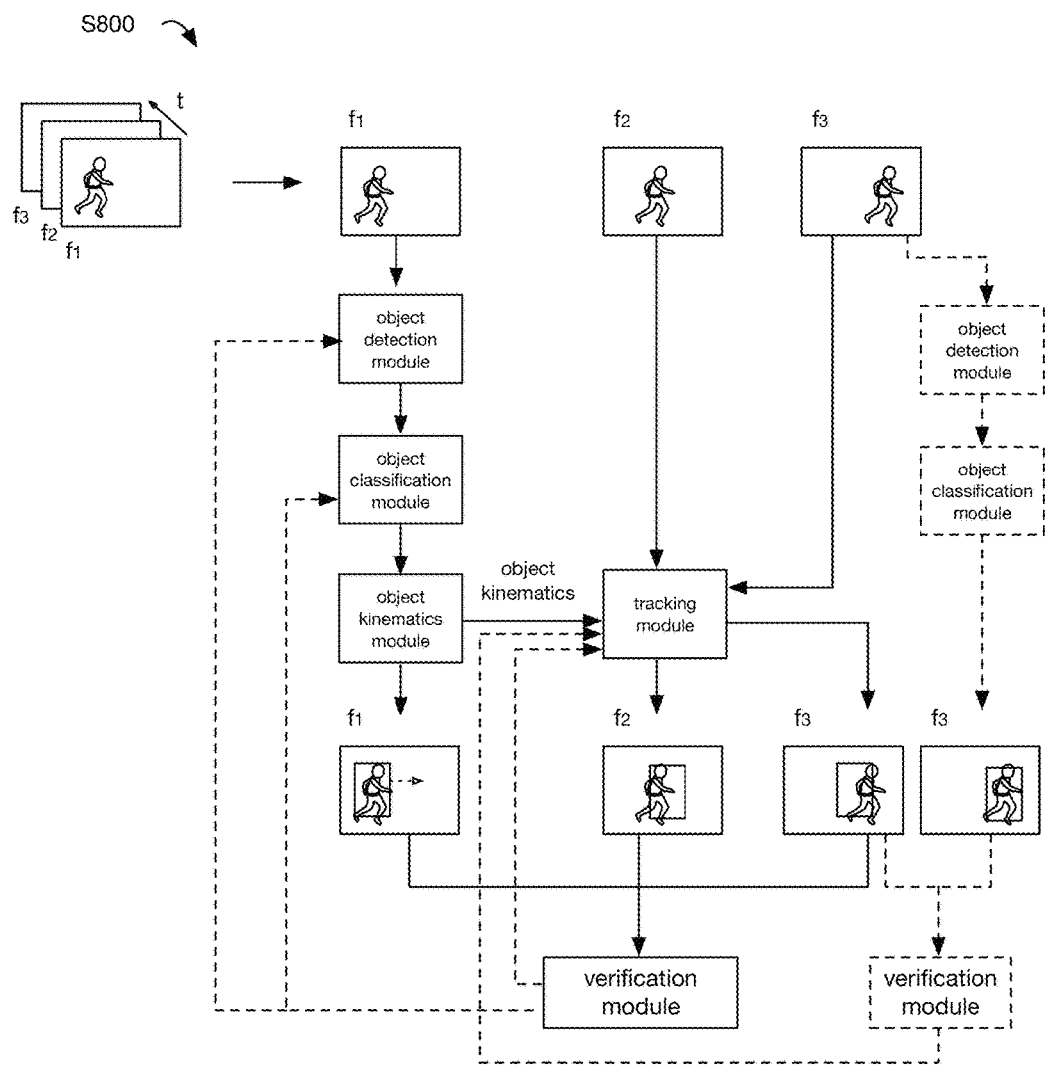
FIG. 10 depicts an example of image analysis based on an image sequence.

Block S800 can optionally include training the tracking module (example shown in FIG. 10). Training the tracking module can include: tracking an object using the tracking module to estimate an object location (e.g., based on object kinematics determined using a kinematics module associated with the tracking module) in a second frame subsequent to a first frame, wherein the first and second frame are separated by a predetermined number of frames; recognizing the object in the second frame using the method 100, comparing the object location estimated using the tracking module to the object location determined based on the application of the method 100 to the second frame (e.g., verifying the tracking module estimate); determining a difference between the detected and estimated object locations; and retraining the tracking module based on the determined difference. However, Block S800 can include otherwise training the tracking module in any suitable manner.

In a first specific implementation, Block S800 includes: recording a sequential image, wherein the image is a first frame of an image sequence recorded with the vehicle system, and the sequential image is a second frame of the image sequence; automatically defining a tracked bounding box about the detected object within the second frame based upon a predicted trajectory of the detected object between the first and second frame; wherein the predicted trajectory is determined by a tracking module; modifying the second frame with the tracked bounding box to generated a modified second frame; at the verification module, labeling the tracked bounding box within the modified second frame as one of a false positive, a false negative, a true positive, and a true negative based on a comparison between the predicted trajectory and an actual trajectory of the detected object between the first and second frame; training the tracking module with the label for the tracked bounding box; and automatically tracking detected objects within a second image sequence recorded with the vehicle system based on the trained tracking module.

In a second specific implementation, Block S800 includes automatically defining the bounding box about the detected object (e.g., within a first image of the image sequence), and further comprising defining bounding boxes around the object within subsequent images of the image sequence based on a predicted trajectory of the object. In a related implementation, the method includes receiving a user selection of a bounding box defined within the image sequence, wherein receiving the user selection labels the bounding box as a false positive.

5. SPECIFIC EXAMPLES

In a first specific example of the method, an initial set of image data is manually labeled and used to train a first iteration of an object recognition module. Real-world image data is collected at a vehicle system implementing the first iteration of the module, generating a second set of image data preliminarily and automatically annotated by the first iteration of the module. The annotated image data is then verified by a user at a user interface of the verification module, wherein the user eliminates the false positives and converts any false negatives into true positives to generate new labeled image data. The module is then trained based on the new labeled image data to generate a second iteration of the module that has improved object recognition performance, and the first iteration of the module executing at the vehicle system is replaced with the second iteration. The aforementioned processes are repeated iteratively as new image data is gathered at the vehicle system until the module performance converges to a steady state performance (e.g., the number of false positives and/or false negatives produced during automated labeling does not substantially decrease between successive iterations).

Figure 8:
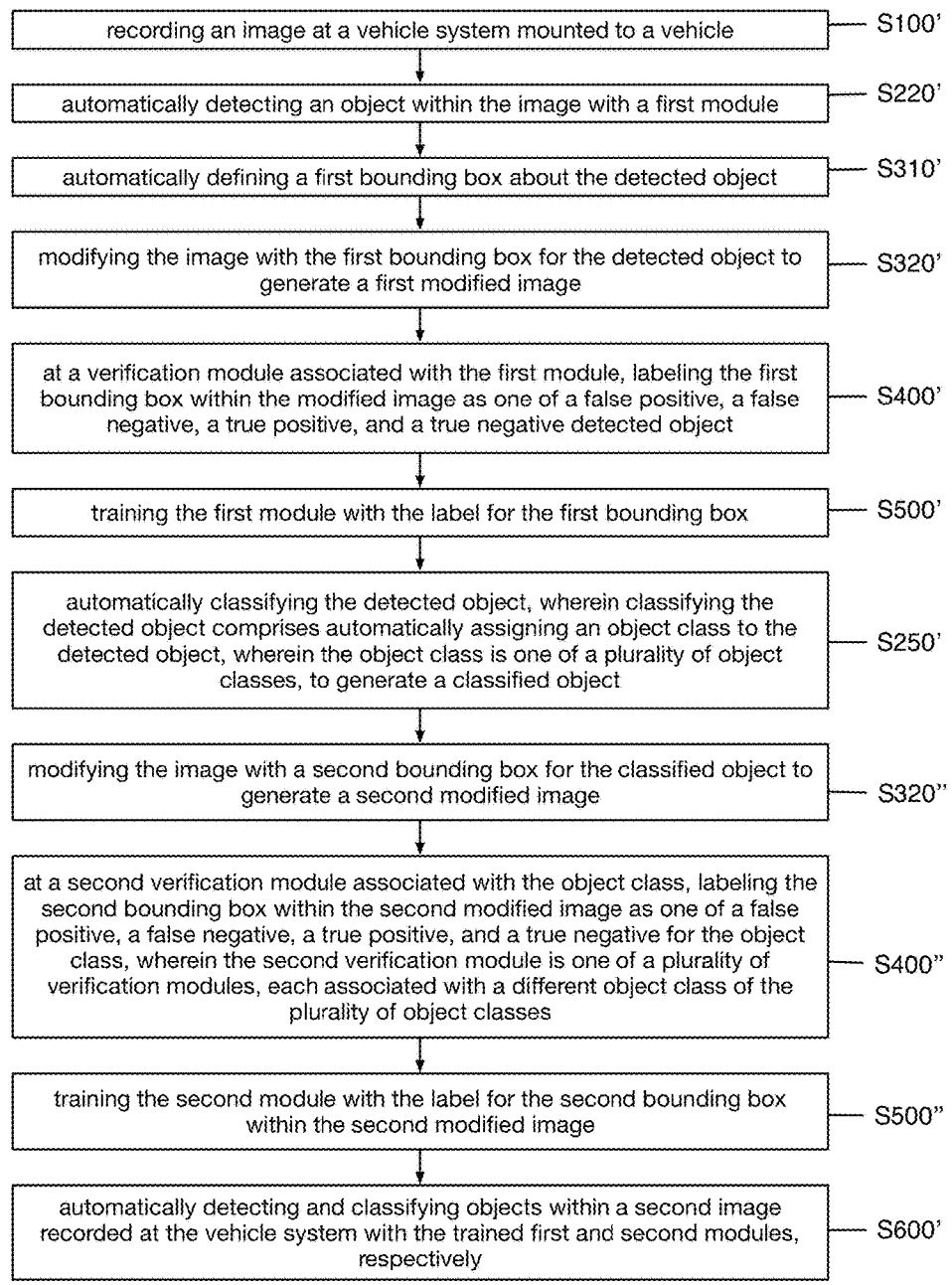
FIG. 8 depicts a flowchart of a first specific example of a variation of the method for image analysis.

In a second specific example, as shown in FIG. 8, the method includes recording an image at a vehicle system mounted to a vehicle S100'; automatically detecting an object within the image with a first module S220'; automatically defining a first bounding box about the detected object S310'; modifying the image with the first bounding box for the detected object to generate a first modified image S320'; at a verification module associated with the first module, labeling the first bounding box within the modified image as one of a false positive, a false negative, a true positive, and a true negative detected object S400'; training the first module with the label for the first bounding box S500'; automatically classifying the detected object, wherein classifying the detected object comprises automatically assigning an object class to the detected object, wherein the object class is one of a plurality of object classes, to generate a classified object S250'; modifying the image with a second bounding box for the classified object to generate a second modified image S320"; at a second verification module associated with the object class, labeling the second bounding box within the second modified image as one of a false positive, a false negative, a true positive, and a true negative for the object class, wherein the second verification module is one of a plurality of verification modules, each associated with a different object class of the plurality of object classes S400"; training the second module with the labels for the second bounding box within the second modified image S500"; and automatically detecting and classifying objects within a second image recorded with the vehicle system with the trained first and second modules, respectively S600'.

Figure 9:
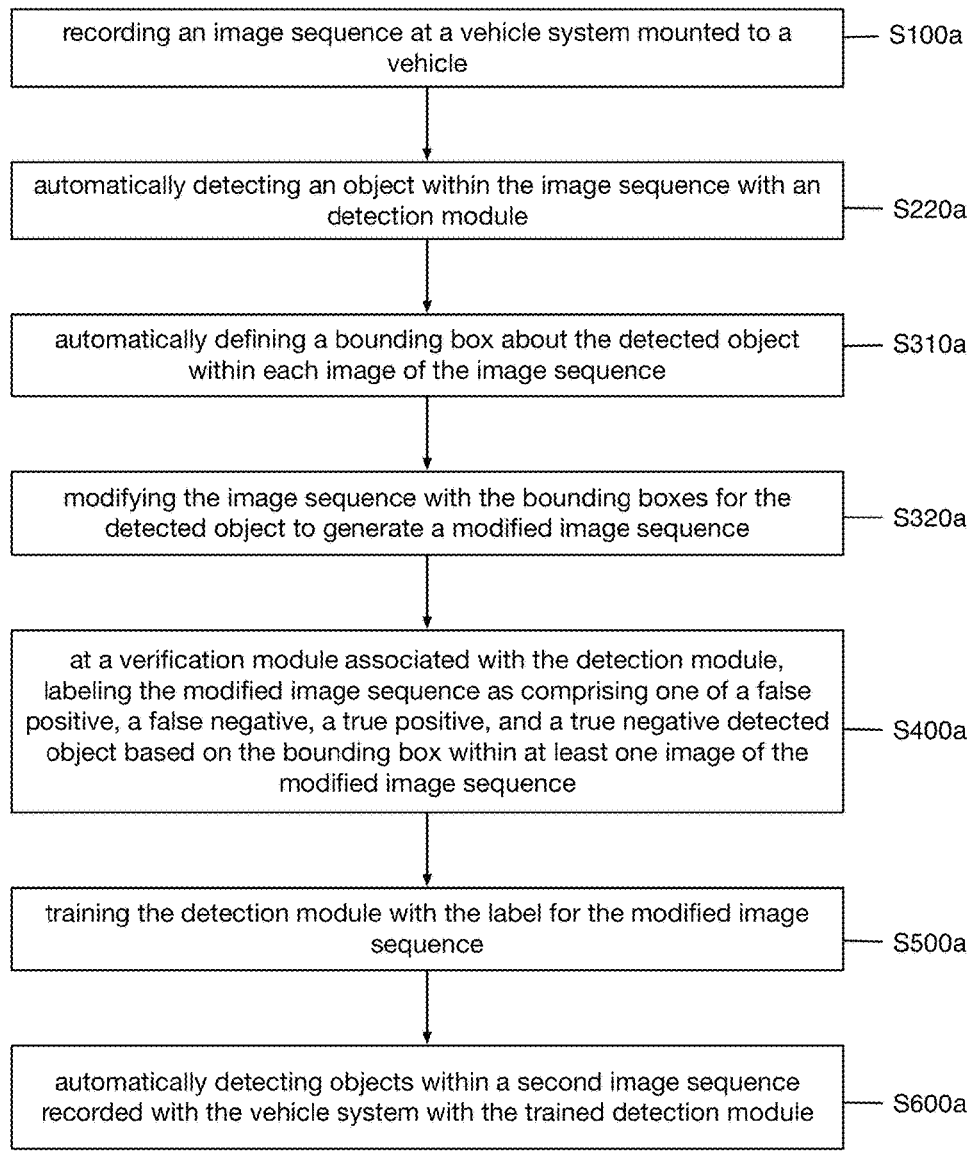
FIG. 9 depicts a flowchart of a second specific example of a variation of the method for image analysis.

In a third specific example, as shown in FIG. 9, the method includes recording an image sequence at a vehicle system mounted to a vehicle S100a; automatically detecting an object within the image sequence with a detection module S220a; automatically defining a bounding box about the detected object within each image of the image sequence S310a; modifying the image sequence with the bounding boxes for the detected object to generate a modified image sequence S320a; at a verification module associated with the detection module, labeling the modified image sequence as comprising one of a false positive, a false negative, a true positive, and a true negative detected object based on the bounding box within at least one image of the modified image sequence S400a; training the detection module with the label for the modified image sequence S500a; automatically detecting objects within a second image sequence recorded with the vehicle system with the trained detection module S600a.

The method 100 and/or systems of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of a processor and/or a controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in a flowchart or block diagrams can represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession can, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:
1. A method for image analysis, comprising:
  recording an image at a vehicle system mounted to a vehicle;
  automatically detecting an object within the image with a first module;
  automatically defining a first bounding box about the detected object;
  modifying the image with the first bounding box for the detected object to generate a first modified image;
  at a first verification module associated with the first module, labeling the first bounding box within the modified image as one of a false positive, a false negative, a true positive, and a true negative detected object;
training the first module with the label for the first bounding box;
automatically classifying the detected object with a second module, wherein classifying the detected object comprises automatically assigning an object class to the detected object, wherein the object class is one of a plurality of object classes, to generate a classified object;
modifying the image with a second bounding box for the classified object to generate a second modified image, wherein the second modified image comprises a set of pixels;
at a second verification module associated with the object class, labeling the second bounding box within the second modified image as one of a false positive, a false negative, a true positive, and a true negative for the object class, wherein the second verification module is one of a plurality of verification modules, each associated with a different object class of the plurality of object classes, wherein labeling the second bounding box comprises:
automatically determining a horizon in the second modified image based on image fiducials, and
automatically labeling the detected object as a false positive based on at least a portion of the second bounding box comprising pixels of the set of pixels located above the horizon;
training the second module with the label for the second bounding box within the second modified image; and
automatically detecting and classifying objects within a second image, recorded at the vehicle system, with the trained first module and trained second module, respectively.

2. The method of claim 1, wherein the first module is executed by the vehicle system, the method further comprising transmitting the first modified image from the vehicle system to a remote computing system, remote from the vehicle.

3. The method of claim 2, wherein the modified image is transmitted from the vehicle system to the remote computing system in response to detection of an object within the image.

4. The method of claim 1, wherein the first and second module are a first and second level of a cascaded classification system.

5. The method of claim 1, further comprising:
automatically classifying the classified object by assigning a second object class to the classified object with a third module, wherein the second object class is one of the plurality of object classes, to generate a subclassified object;
modifying the image with a third bounding box for the subclassified object to generate a third modified image;
at a third verification module associated with the second object class, labeling the third bounding box within the third modified image as one of a false positive, a false negative, a true positive, and a true negative for the second object class;
training the third module with the label for the third bounding box within the third modified image; and
automatically classifying objects within the second image recorded with the vehicle system with the trained third module.

6. The method of claim 1, wherein the first and second verification modules each comprise a user interface, wherein labeling comprises:
receiving a user selection of the bounding box within the modified image, wherein receiving the user selection labels the bounding box as a false positive.

7. The method of claim 6, further comprising receiving a user boundary input about an image region, generating a user bounding box about the image region based on the user boundary input, and wherein receiving the user boundary input labels the user bounding box as a false negative.

8. The method of claim 1, further comprising:
recording a sequential image, wherein the image is a first frame of an image sequence recorded with the vehicle system, and the sequential image is a second frame of the image sequence;
automatically defining a tracked bounding box about the classified object within the second frame based upon a predicted trajectory of the classified object between the first and second frame; wherein the predicted trajectory is determined by a tracking module based on the object class of the classified object;
modifying the second frame with the tracked bounding box to generate a modified second frame;
at the second verification module, labeling the tracked bounding box within the modified second frame as one of a false positive, a false negative, a true positive, and a true negative based on a comparison between the predicted trajectory and an actual trajectory of the classified object between the first and second frame;
training the tracking module with the label for the tracked bounding box; and
automatically tracking classified objects within a second image sequence recorded with the vehicle system based on the trained tracking module.

9. A method for image analysis, comprising:
recording an image sequence at a vehicle system mounted to a vehicle;
automatically detecting an object within the image sequence with a detection module;
automatically defining a bounding box about the detected object within each image of the image sequence;
modifying the image sequence with the bounding boxes for the detected object to generate a modified image sequence;
at a verification module associated with the detection module, labeling the modified image sequence as comprising one of a false positive, a false negative, a true positive, and a true negative detected object based on the bounding box within at least one image of the modified image sequence;
training the detection module with the label for the modified image sequence;
automatically detecting objects within a second image sequence recorded with the vehicle system with the trained detection module;
automatically classifying the detected object with a classification module, wherein classifying the detected object comprises automatically assigning an object class to the detected object based on a vehicle context parameter determined at the vehicle system, wherein the object class is one of a plurality of object classes, to generate a classified object;
modifying the image sequence with a second bounding box for the classified object within each image of the image sequence to generate a second modified image sequence;

at a second verification module associated with the object class, labeling the second modified image sequence as comprising one of a false positive, a false negative, a true positive, and a true negative for the object class based on the second bounding box within at least one image of the second modified image sequence, wherein the second verification module is one of a plurality of verification modules, each associated with a different object class of the plurality of object classes; and training the classification module with the labels for the second bounding box within the second modified image sequence; and automatically classifying objects within the second image sequence recorded with the vehicle system with the trained classification module.

10. The method of claim 9, wherein the vehicle context parameter comprises a roadway type on which the vehicle is driving.

11. The method of claim 9, further comprising:

automatically classifying the classified object by assigning second object class to the classified object with a second classification module, wherein the second object class is one of the plurality of object classes, to generate a subclassified object;

modifying the image sequence with a third bounding box for the subclassified object within each image of the image sequence to generate a third modified image sequence;

at a third verification module associated with the second object class, labeling the third modified image sequence as one of a false positive, a false negative, a true positive, and a true negative for the second object class based the third bounding box within at least one image of the third modified image sequence;

training the third module with the label for the third modified image sequence; and automatically classifying objects within the second image sequence recorded with the vehicle system with the trained third module.

12. The method of claim 9, wherein detecting the object comprises detecting the object at the vehicle system with a first copy of the detection module, wherein training the detection module comprises training a second copy of the detection module at the remote computing system, and further comprising updating the first copy of the detection module based on the trained second copy of the detection module.

13. The method of claim 9, wherein the vehicle system comprises an accelerometer that outputs an accelerometer signal, and further comprising recording the image sequence in response to an accelerometer signal amplitude exceeding a threshold amplitude.

14. The method of claim 9, wherein automatically defining the bounding box about the detected object comprises defining a bounding box within a first image of the image sequence, and further comprising defining bounding boxes around the object within subsequent images of the image sequence based on a predicted trajectory of the object, wherein the predicted trajectory is based on the object class.

15. The method of claim 14, further comprising receiving a user selection of a bounding box defined within the image sequence, wherein receiving the user selection labels the bounding box as a false positive.

16. The method of claim 9, wherein each vehicle system of a plurality of vehicle systems implements a version of the detection module, further comprising training a master version of the detection module based on a ranked voting among labeled boundary boxes corresponding to each version of the detection module, and modifying each version of the detection module based on the trained master version of the detection module.

17. The method of claim 16, wherein each version of the detection module comprises a substantially identical copy of the detection module.

* * * * *